(12) United States Patent
Yanai et al.

(10) Patent No.: US 8,123,015 B2
(45) Date of Patent: Feb. 28, 2012

(54) OVERLOAD SAFETY APPARATUS FOR ROBOT HAND

(75) Inventors: Katsuya Yanai, Tokyo (JP); Fumio Urushibara, Chiba (JP)

(73) Assignee: Showa Denko K.K., Tokyo (JP)

( * ) Notice: Subject to any disclaimer, the term of this patent is extended or adjusted under 35 U.S.C. 154(b) by 1127 days.

(21) Appl. No.: 11/987,077

(22) Filed: Nov. 27, 2007

(65) Prior Publication Data

US 2008/0131234 A1 Jun. 5, 2008

(30) Foreign Application Priority Data

Dec. 1, 2006 (JP) .................. 2006-325346

(51) Int. Cl.
*B25J 17/00* (2006.01)
(52) U.S. Cl. ............... 192/56.41; 192/150; 192/84.3; 901/29; 901/49; 74/490.05; 74/490.06
(58) Field of Classification Search ............ 192/56.41, 192/56.42; 901/29; 74/490.06
See application file for complete search history.

(56) References Cited

U.S. PATENT DOCUMENTS

| 4,242,778 A | * | 1/1981 | Kay | .......................... 24/573.11 |
| 4,609,325 A | * | 9/1986 | Gabrielli | ....................... 33/644 |

* cited by examiner

*Primary Examiner* — David D Le
*Assistant Examiner* — Ryan Dodd
(74) *Attorney, Agent, or Firm* — Wenderoth, Lind & Ponack, LLP.

(57) ABSTRACT

In a robot hand overload safety apparatus, a first magnetically attracting bearing face 3 is provided at a robot hand mounting portion, and a second magnetically attracting bearing face 9 is provided on the robot hand 4, so that the second magnetically attracting bearing face 9 is magnetically attracted by the first magnetically attracting bearing face 3 and the robot hand 4 is mounted and supported, and in which a shaft 10 projecting from the first or second magnetically attracting bearing face 3, 9 is fitted into a hole or groove 11 opening on the other bearing face, so that the robot hand 4 rotates in the lateral direction, moves in the vertical direction or inclines in the fore-and-aft direction against the magnetically attracting force via the fitting between the shaft and the hole or groove 11 due to an overload exerted to the robot hand 4.

13 Claims, 5 Drawing Sheets

OVERLOAD SAFETY APPARATUS FOR ROBOT HAND

BACKGROUND OF THE INVENTION

1. Field of the Invention

The present invention relates to a safety apparatus to protect against an overload exerted to a robot hand of a robot.

2. Related Art

In an overload safety apparatus according to the related art, a robot hand and a mounting portion thereof are joined so as to be capable of moving via a link mechanism or the like, the displacement of the robot hand due to the overload is detected by a sensor, and a robot body is stopped by the detection signal, so that the robot hand and the robot body are protected from the overload.

SUMMARY OF THE INVENTION

The safety apparatus in the related art has low flexibility since the range and direction of displacement of the robot hand is limited, and it is expensive to obtain high flexibility because upsizing and increase in weight of a link mechanism or the like are inevitable.

When an overload exceeding a movable range is exerted to the robot hand, collision or damage of members results, and the robot body is subjected to serious damage, so that there arises a problem that excessive cost and time are required for the maintenance thereof.

The present invention provides an overload safety apparatus which is reduced in size, weight and cost, and functions effectively to protect against an overload exerted to the robot hand.

In order to achieve the invention, the invention provides an overload safety apparatus for a robot hand employing a configuration in which the robot hand is mounted and supported by causing a second magnetically attracting bearing face provided on the robot hand to be magnetically attracted by a first magnetically attracting bearing face provided on a mounting portion of the robot hand, and a configuration in which a shaft projecting from one of the first and second magnetically attracting bearing faces is fitted into a hole or groove opening on the other one of the first and second magnetically attracting bearing faces, so that the robot hand is movable in the lateral direction, the vertical direction or the fore-and-aft direction against the magnetically attracting force via the fitting between the shaft and the hole or groove by the overload exerted to the robot hand.

For example, the hole or groove is formed into a vertically elongated hole or groove extending in the direction that intersects with the lateral rotating direction so as to allow the robot hand to move in the vertical direction against the magnetically attracting force in the longitudinal direction of the elongated hole or elongated groove by a vertical overload exerted to the robot hand, or to be inclined forward or rearward against the magnetically attracting force in the direction in which the second attracting bearing face moves apart from the first magnetically attracting, force by the overload in the fore-and-aft direction, that is, to be inclined forward or rearward in the direction in which the shaft is pulled out from the hole or groove. Alternatively, the invention provides a configuration in which the robot hand rotates in the lateral direction about the shaft as a fulcrum in response to the overload in the lateral direction.

In addition to the configuration described above, a load receiving portion for receiving the load of the robot hand by supporting the lower end of the second magnetically attracting bearing face at the lower end of the first magnetically attracting bearing face is provided for supporting the robot hand by the load receiving portion and allowing the robot hand to rotate in the lateral direction, to move in the vertical direction or to incline in the fore-and-aft direction.

As means for providing the magnetically attracting force to the first and second magnetically attracting bearing faces, the invention provides a configuration in which first and second mounting bearing faces themselves which form the attracting bearing faces are formed of magnet, or the first and second mounting bearing faces are formed of metal plates (magnetic plates), and magnets are uniformly embedded in one or both of the bearing plates (both bearing faces) so that a uniform magnetically attracting force is provided to both bearing faces.

As a preferable example, the invention provides a configuration in which a lower half of the first magnetically attracting bearing face or a lower half of the second magnetically attracting bearing face, that is, a lower half of the first mounting bearing plate or a lower half of the second mounting bearing plate is formed of magnet, or is provided with magnets embedded therein so as to provide the magnetically attracting force to the lower halves of the both attracting bearing, faces and not to provide the magnetically attracting force to upper halves thereof.

Furthermore, the invention provides a configuration in which the load receiving portion by itself is formed of magnet, or a configuration in which the load, receiving portion is formed of a magnetic body and is provided with a magnet embedded therein to provide the magnetically attracting force for magnetically attracting the lower end of the second magnetically attracting bearing face (second mounting bearing plate).

According to the overload safety apparatus for a robot hand, an effective function to protect against overload exerted to the robot hand in the lateral direction, the vertical direction or the fore-and-aft direction is achieved by a configuration reduced in size, weight and cost in a simplified structure in which the first and second mounting bearing plates are magnetically attracted to each other and supported by the shaft.

DESCRIPTION OF THE PREFERRED EMBODIMENTS

Referring now to FIG. 1 to FIG. 10, a best mode for carrying out the present invention will be described.

Figure 1:
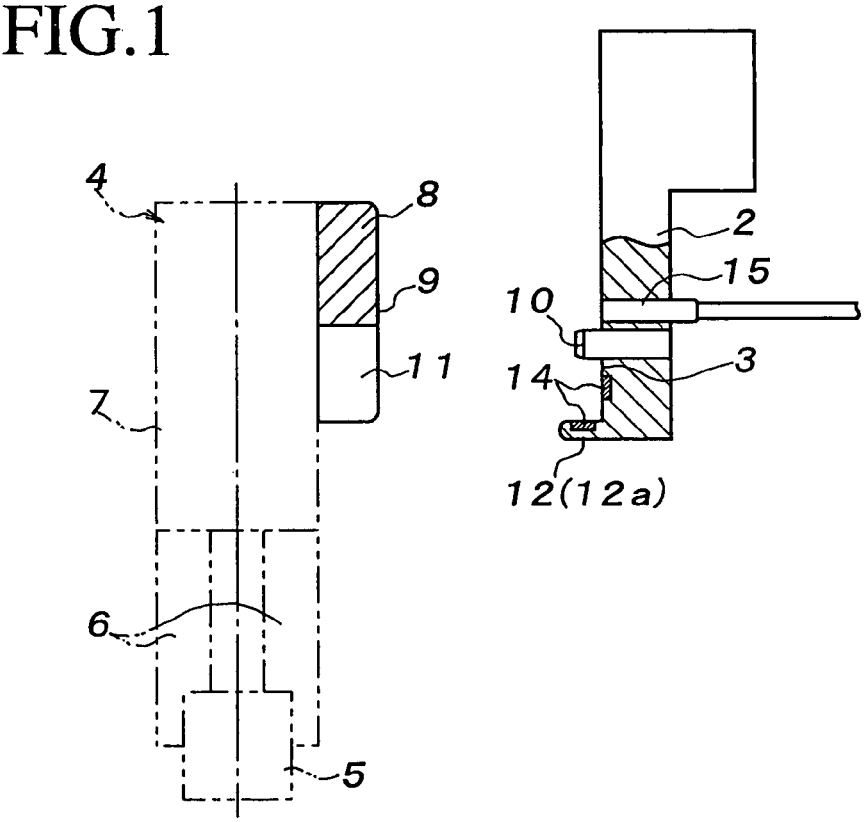
FIG. 1 is a cross-sectional view showing a state before mounting a robot hand through magnetic attraction.
Figure 2:
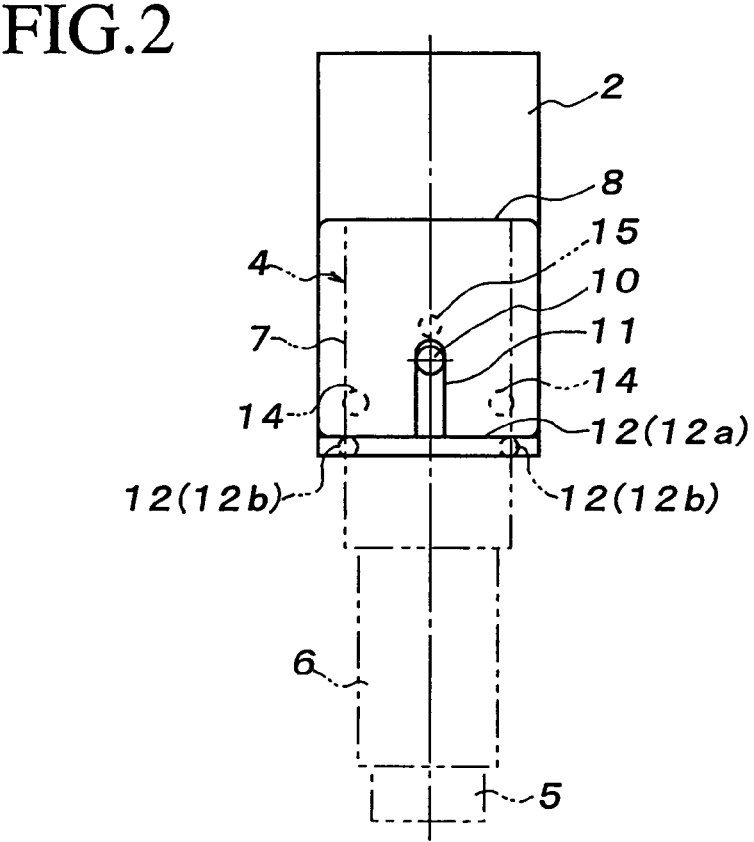
FIG. 2 is a front view showing a state after mounting the robot hand through magnetic attraction.
Figure 3:
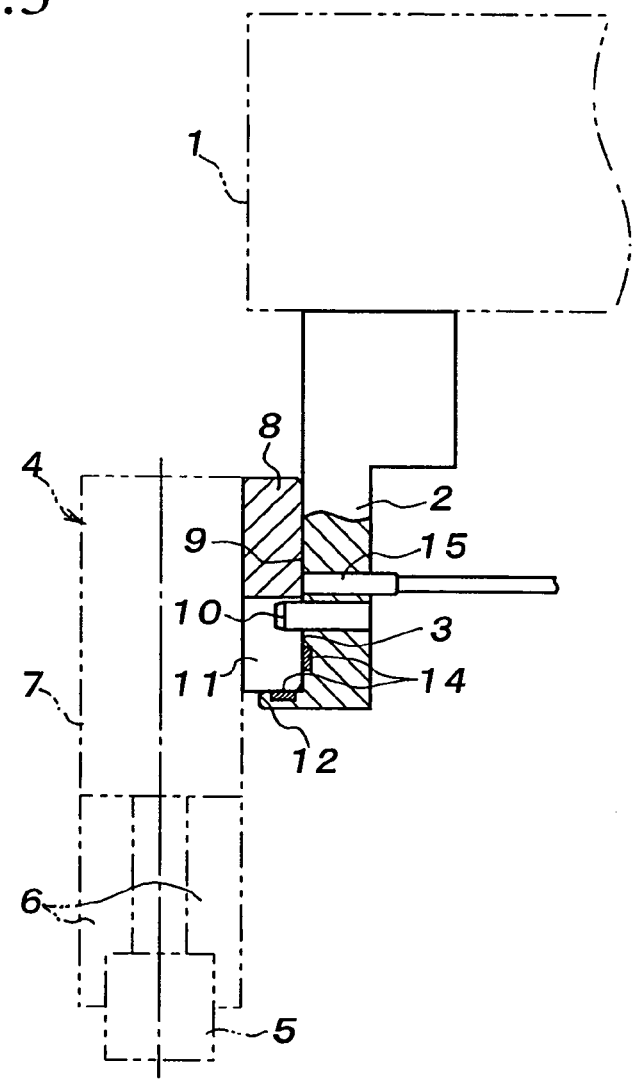
FIG. 3 is a cross-sectional view showing a state after mounting the robot hand through magnetic attraction.

As shown in FIG. 1 to FIG. 3, a first mounting bearing plate 2 is provided on an arm 1 of a robot body, for example, by attaching in the vertical direction, and the front surface of the first mounting bearing plate 2 is provided as a first magnetically attracting beating face 3.

On the other hand, a robot hand 4 includes a drive unit 7 having a drive mechanism for an end effecter 6 represented by a chuck integrated therein, and the end effecter 6 extending from the drive unit 7, for example, downward, and acts on a work piece 5 by, for example, opening and closing the end effecter 6 by the drive unit 7.

A second mounting bearing plate 8 is integrally provided on the rear surface of the drive unit 7 of the robot hand 4, and the front surface of the second mounting bearing plate 8 is provided as a second magnetically attracting bearing face 9.

The second magnetically attracting bearing face 9 is caused to be magnetically attracted by the first magnetically attracting bearing face 3, so that the robot hand 4 is mounted and supported. In other words, the second magnetically attracting bearing face 9 provided on the robot hand 4 is caused to be attracted by the first magnetically attracting bearing face 3 provided at the mounting portion of the robot hand 4 to detachably mount and support the robot hand 4.

In addition to the configuration described above, a load receiving portion 12 for receiving the load, of the robot hand 4 by supporting the lower end of the second magnetically attracting bearing face (the lower end of the second mounting bearing plate 8) at the lower end of the first magnetically attracting bearing face 3 (the lower end of the first mounting bearing plate 2) is provided, so that the robot hand 4 is supported by the load receiving portion 12 to allow the robot hand 4 to rotate in the lateral direction, to move in the vertical direction or to be inclined in the fore-and-aft direction.

In addition, as an additional structure, an L-shaped load receiving shelf 12a is provided so as to protrude from the lower end of the first mounting bearing plate 2 to form the load receiving portion 12 as shown in FIG. 1.

As shown in FIG. 2 by a dot line, a load receiving pin 12b is provided so as to protrude from the lower end of the first mounting bearing plate 2 to form the load receiving portion 12.

As shown in FIG. 10A, the lower end of an elongated hole or an elongated groove 11 is opened by a wide opening portion 13, and the inner surface of the wide opening portion 13 is supported by a spherical surface of a spherical block 12c protruded from the lower end of the first mounting bearing plate 2 or, as shown in FIG. 10B, the inner surface of the wide opening portion 13 is supported by two isosceles sides of a triangle block 12d provided so as to protrude from the lower end of the first mounting bearing plate 2 to form the load receiving portion 12.

Figure 4:
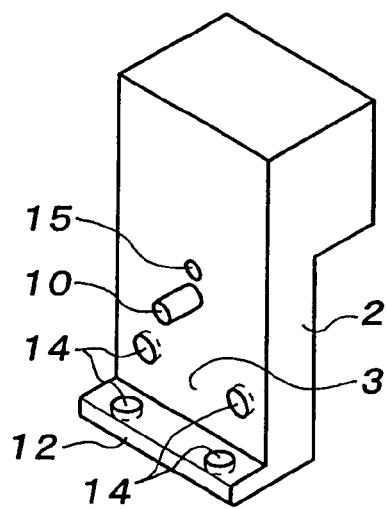
FIG. 4 is a perspective view showing an example of an arrangement of magnets.

As means for providing a magnetically attracting force to the first and second magnetically attracting bearing faces 3, 9, the invention provides a configuration in which one or both of the first and second mounting bearing plates 2, 8 by themselves are formed of magnet or, as shown in FIG. 4, magnets 14 are embedded uniformly in one or both of the first and second magnetically attracting bearing faces 3, 9 (first and second mounting bearing plates 2, 8), for example, the first magnetically attracting hearing face 3 (the first mounting bearing plate 2), to provide a uniform magnetically attracting force to the both bearing faces 3, 9.

As a preferable example, the invention provides a configuration in which the magnets 14 are embedded in the lower half of the first magnetically attracting hearing face 3 (the first mounting bearing plate 2) or in the lower half of the second magnetically attracting bearing face 9 (the second mounting bearing plate 8) to provide a magnetically attracting force to the lower halves of both of the attracting bearing faces 3, 9, and not to provide the magnetically attracting, force to upper halves of the same. As an example, the magnets 14 are arranged on the lower side of a shaft 10.

Furthermore, the invention provides a configuration in which the load receiving portion 12 by itself is formed of magnet, or the magnets 14 are embedded therein to provide a magnetically attracting force to the load receiving surface of the load receiving portion 12 so that the lower end of the second magnetically attracting hearing face 9 (the lower end of the second mounting bearing plate 8) is magnetically attracted.

The magnets 14 to be embedded are known disc-shaped magnets, and a plurality of magnets 14 are arranged.

When the load receiving portion 12 is formed of the load receiving pin 12b, it is preferable to form the load receiving pin 12b by itself of magnet.

The magnets 14 demonstrate the magnetically attracting force at the end surfaces thereof on the surface of the first magnetically attracting bearing face 3 or the surface of the second magnetically attracting bearing face 9.

Furthermore, the shaft 10 is provided so as to protrude from one of the hearing faces of the first and second magnetically attracting bearing faces 3, 9, for example, from the first magnetically attracting bearing face 3 of the first mounting hearing plate 2. In other words, the shaft 10 is protruded forward from the first mounting bearing plate 2, and the hole or groove 11 opening on the second magnetically attracting bearing face 9 is provided on the other bearing face, for example, on the second mounting bearing plate 8, and the shaft 10 is aligned with the interior of the hole or groove 11 so as not to be capable of moving, fitted with an allowance so as to be movable in any directions, or fitted loosely so as to be movable in the vertical direction. Generally speaking, the shaft 10 is fitted to the hole or groove 11, so that the robot hand 4 is caused to rotate in the lateral direction, to move in the vertical direction or to be inclined in the fore-and-aft direction against the magnetically attracting force via the fitting between the shaft 10 and the hole or groove 11 when an overload which is larger than the magnetically attracting force is exerted to the robot hand 4. In other words, the robot hand 4 is caused to rotate in the lateral direction, to move in the vertical direction, or to be inclined in the fore-and-aft direction while holding attraction by the magnetically attracting force.

The invention provides a configuration in which the robot hand 4 is rotatable in the lateral direction about the cylindrical shaft 10 as a fulcrum by aligning the cylindrical shaft 10 with the cylindrical hole 11

The invention provides a configuration in which the robot hand 4 is capable of rotating in the lateral direction, moving in the vertical direction, and inclining in the fore-and-aft direction about the shaft 10 as a fulcrum within the range of the allowance by loosely fitting the shaft 10 into the hole or groove 11.

Figure 9:
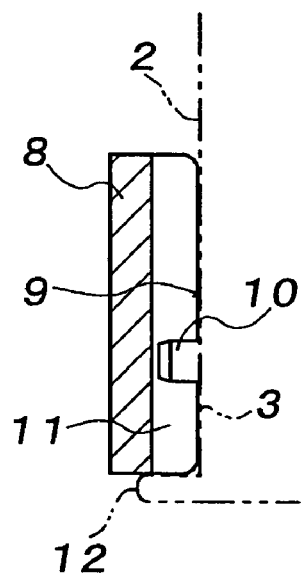
FIG. 9 is a cross-sectional view showing an example of a hole or groove to which a shaft is fitted.
Figure 10:
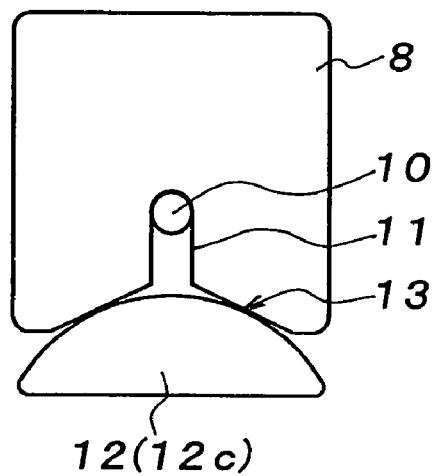
FIGS. 10A and 10B are front views of other examples of a load receiving portion.
Figure 10:
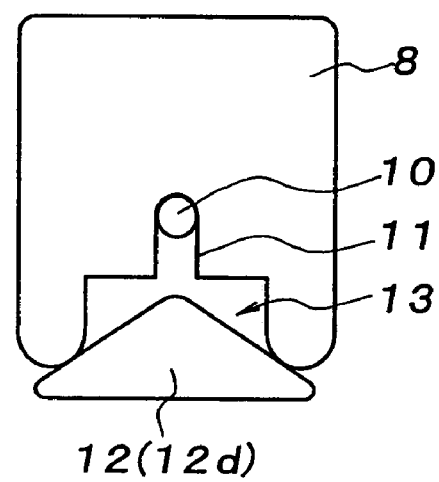

As shown in FIG. 2 and FIG. 9, the hole or groove 11 is elongated in the vertical direction so as to intersect with the direction of lateral rotation, so that the shaft 10 is capable of relatively moving longitudinally of the hole or groove 11.

Furthermore, a detailed example will be given here. As shown in the drawings, the lateral movement of the cylindrical shaft 10 (the lateral movement of the robot hand 4) is defined by the inner surface of the hole or groove 11 and the rotation about the shaft 10 is allowed.

By determining the width of the short side of the vertically elongated hole or groove 11 to be substantially the same dimension as the outer diameter of the cylindrical shaft 10, the mounting position of the robot hand 4 is determined and mounting at a position displaced in the lateral direction is prevented.

In a case in which the had receiving portion 12 is provided, setting of the mounting position of the robot hand 4 is easily and reliably achieved in cooperation with the definition of the position by the fit to the hole or groove 11 while defining the position of the lower side of the mounting bearing plate 2 on the side of the robot hand 4 by the load receiving portion 12.

Figure 5:
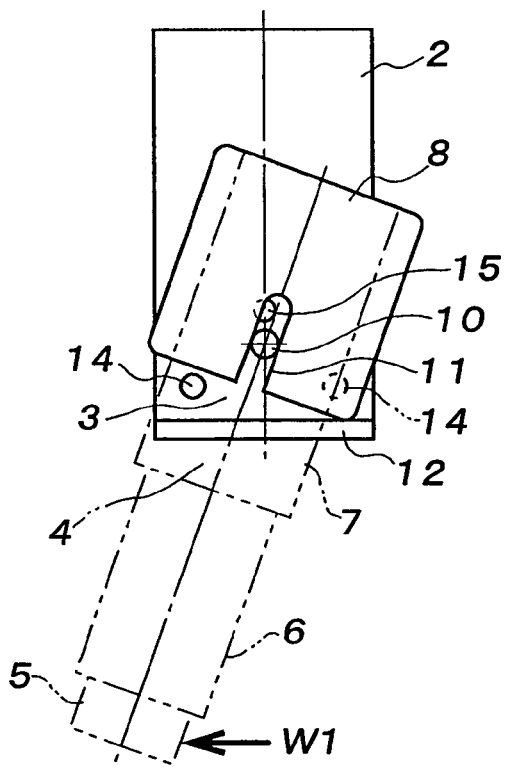
FIG. 5 is a front view showing a state in which the robot hand is rotated by an overload in the lateral direction.

As shown in FIG. 5, when a lateral overload W1 which is larger than the magnetically attracting force is exerted to the robot hand 4, the robot hand 4 rotates leftward or rightward against the magnetically attracting force about the shaft 10 as a fulcrum while maintaining the attracting force and absorbing the overload W1.

When the load, receiving portion 12 is provided, the robot hand 4 rotates leftward or rightward while moving slightly upward along the elongated hole or elongated groove 11 while being attracted and supported at the right end or the left end of the lower end of the second mounting bearing plate 8 by the load receiving portion 12.

When the overload W1 is removed, the robot hand 4 is restored by its own weight to its original position where it is supported by the load receiving portion 12. The restoration of the robot hand 4 to its original position is supplemented by the configuration in which the magnetically attracting force is provided, for example, by arranging the magnets 14 on the lower half of the first magnetically attracting bearing face 3 or the second magnetically attracting bearing face 9 and the configuration in which the magnetically attracting force is provided, for example, by arranging the magnets 14 in the load receiving portion 12.

Figure 6:
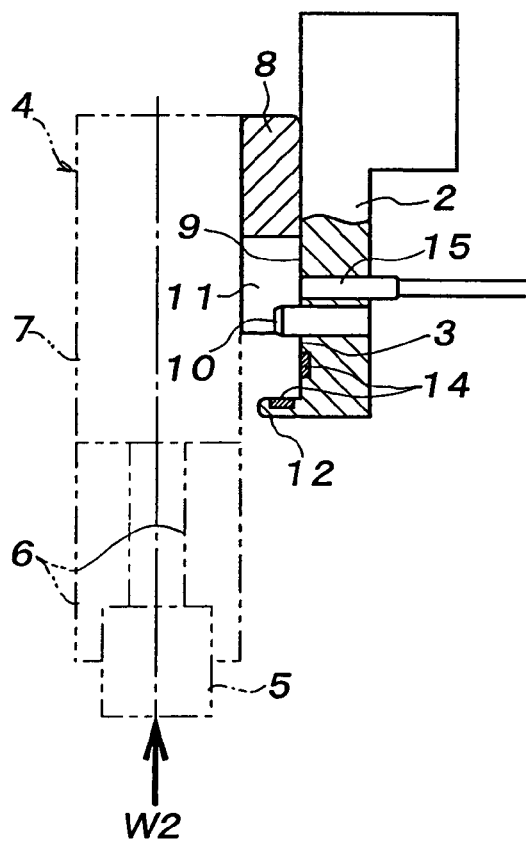
FIG. 6 is a cross-sectional view showing a state in which the robot hand is moved by an overload in the vertical direction.

Subsequently, as shown in FIG. 6, a vertical overload W2 larger than the magnetically attracting force, that is, the upward overload W2 is exerted to the robot hand 4, the robot hand 4 is moved upward in the longitudinal direction of the elongated hole or elongated groove 11 against the magnetically attracting force while maintaining the attraction and absorbing the overload W2.

After having removed the overload W2, the robot hand 4 is moved downward by its own weight and is restored to its original position where it is supported by the load receiving portion 12. The restoration of the robot hand 4 to its original position is supplemented by the configuration in which the magnetically attracting force is provided, for example, by arranging the magnets 14 on the lower half of the first magnetically attracting bearing face 3 or the second magnetically attracting bearing face 9 and the configuration in which the magnetically attracting force is provided, for example, by arranging the magnets 14 in the load receiving portion 12.

Figure 7:
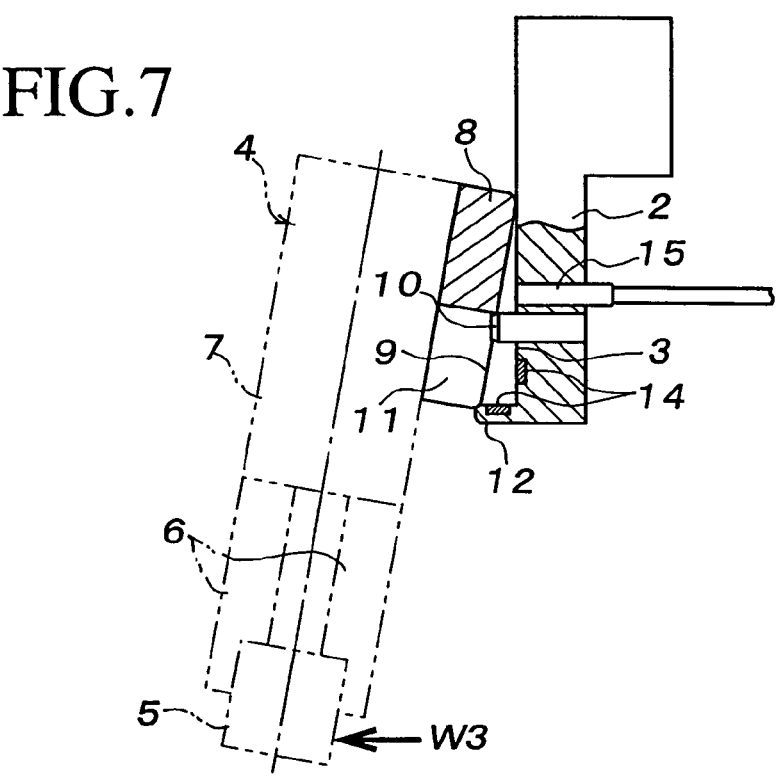
FIG. 7 is a cross-sectional view showing a state in which the robot hand is inclined toward the front by an overload in the fore-and-aft direction.
Figure 8:
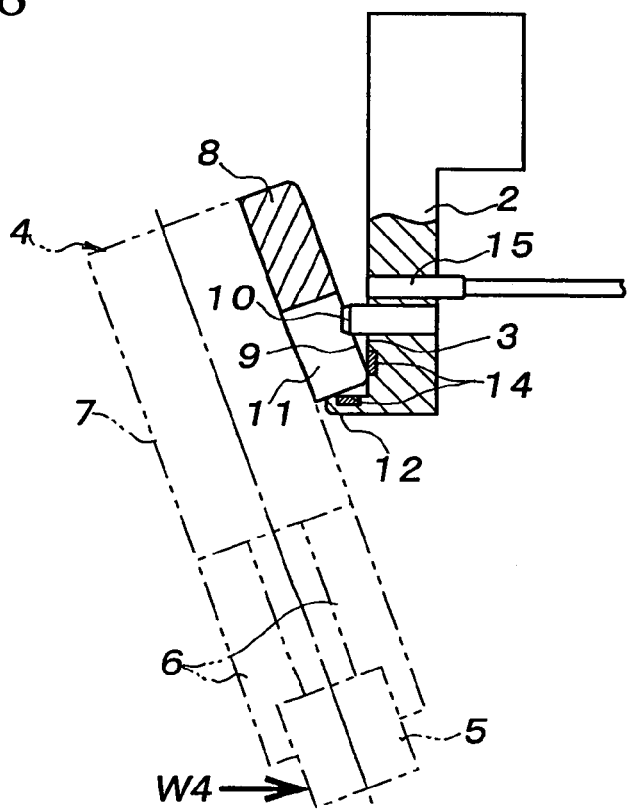
FIG. 8 is a cross-sectional view showing a state in which the robot hand is inclined toward the rear by an overload in the fore-and-aft direction.

Subsequently, as shown in FIG. 7 and FIG. 8, when overloads W3. W4 in the fore-and-aft direction which are larger than the magnetically attracting force are exerted to the robot hand 4, the robot hand 4 is inclined forward or rearward against the magnetically attracting force under the action of the magnetically attracting force in the direction in which the second magnetically attracting bearing face 9 (second mounting bearing plate 8) is moved, apart from the first magnetically attracting bearing face 3 (first mounting bearing plate 2) and absorbs the overloads W3, W4. In other words, it is inclined forward or rearward in the direction in which the shaft 10 is pulled out from the hole or groove 11 to absorb the overload.

When the load receiving portion 12 is provided, the robot hand 4 is attracted and supported at the lower end of the second mounting bearing plate 8 by the load receiving portion 12, and is led to the forward or rearward inclination.

After having removed the overloads W3. W4 the robot hand 4 is restored to its original position by the configuration in which the magnetically attracting force is provided to the lower half of the first magnetically attracting bearing face 3 or the second magnetically attracting bearing face 9 and the configuration in which the magnetically attracting force is provided to the load receiving portion 12.

As shown in FIG. 1 to FIG. 4, a sensor 15 is provided on the first magnetically attracting bearing face 3 as means for detecting rotation, movement or inclination of the robot hand 4, and is arranged so as to oppose the second magnetically attracting bearing face 9.

The sensor 15 is embedded in the mounting bearing plate 2, and the detection end surface thereof is installed so as not to be protruded from the first magnetically attracting bearing face 3, for example, so as to be flush with the first magnetically attracting bearing face 3, and is oriented toward the second magnetically attracting bearing face 9.

The sensor 15 detects the rotation, movement and inclination of the robot hand 4 by the overloads W1 to W4 and causes a manufacturing line or a robot to stop.

What is claimed is:

1. An overload safety apparatus for connection of a robot hand at a robot hand side to a robot arm at a robot arm side, comprising:

a first magnetically attracting bearing face provided at the robot arm side at a portion for mounting of the robot hand; and a second magnetically attracting bearing face provided at the robot hand side;

wherein the second magnetically attracting bearing face is attracted magnetically by the first magnetically attracting bearing face for mounting and supporting the robot hand relative to the robot arm;

wherein a shaft projects from one of the first and second magnetically attracting bearing faces;

wherein a vertically elongated hole or groove is formed to open through the other of the first and second magnetically attracting bearing faces;

wherein the shaft is fitted in the vertically elongated hole or groove so that, absent one of a lateral overload force, a vertical overload force and a fore-and-aft overload force on the second magnetically attracting bearing face at the robot hand side, the second magnetically attracting bearing face is present at an operating position relative to the first magnetically attracting bearing face, and so that the second magnetically attracting bearing face is laterally rotatable relative to the first magnetically attracting bearing face about the shaft in order to allow for rotation of the robot hand relative to the robot arm upon exertion of the lateral overload force on the second magnetically attracting bearing face at the robot hand side, so that the second magnetically attracting bearing face is vertically movable in the vertical direction relative to the first magnetically attracting bearing face by vertical movement of the shaft in and along the vertically elongated hole or groove in order to allow for vertical movement of the robot hand relative to the robot arm upon exertion of the vertical overload force on the second magnetically attracting bearing face at the robot hand side, and so that the second magnetically attracting bearing face is inclinable in the fore-and-aft direction relative to the first magnetically attracting bearing face against the magnetically attracting force via the fitting between the shaft and the hole or groove upon exertion of the fore-and-aft overload force on the second magnetically attracting bearing face at the robot hand side; and wherein the configuration of the first magnetically attracting bearing face and the second magnetically attracting bearing face, as well as fitting of the shaft in the vertically elongated hole or groove, are such that, after any one of a lateral rotation, a vertical movement and a fore-and-aft movement of the second magnetically attracting bearing face relative to the first magnetically attracting bearing face upon exertion of a respective one of the lateral overload force, the vertical overload force, and the fore-and-aft overload force, the second magnetically attracting bearing face will return to the operating position relative to the first magnetically attracting bearing face.

2. The overload safety apparatus according to claim 1, wherein the vertically elongated hole or groove is a hole or groove which intersects with a direction of lateral rotation.

3. The overload safety apparatus according to claim 1, wherein a lower end of the first magnetically attracting bearing face is provided with a load receiving portion configured to support a lower end of the second magnetically attracting bearing face and to receive a load of the robot hand.

4. The overload safety apparatus according to claim 3, wherein the load receiving portion is provided with a magnetically attracting force.

5. The overload safety apparatus according to claim 1, wherein the magnetically attracting force is provided to a lower half of the first magnetically attracting bearing face or a lower half of the second magnetically attracting bearing face.

6. The overload safety apparatus according to claim 2, wherein a lower end of the first magnetically attracting bearing face is provided with a load receiving portion configured to support a lower end of the second magnetically attracting bearing face and to receive a load of the robot hand.

7. The overload safety apparatus according to claim 2, wherein the magnetically attracting force is provided to a lower half of the first magnetically attracting bearing face or a lower half of the second magnetically attracting bearing face.

8. The overload safety apparatus according to claim 3, wherein the magnetically attracting force is provided to a lower half of the first magnetically attracting bearing face or a lower half of the second magnetically attracting bearing face.

9. The overload safety apparatus according to claim 4, wherein the magnetically attracting force is provided to a lower half of the first magnetically attracting bearing face or a lower half of the second magnetically attracting bearing face.

10. The overload safety apparatus according to claim 1, wherein connection of the shaft in the vertically elongated hole or groove and magnetic attraction of the second magnetically attracting bearing face to said first magnetically attracting bearing face is configured to detachably mount and support the robot hand with respect to the robot arm.

11. The overload safety apparatus according to claim 1, further comprising a sensor that detects rotation, vertical movement and fore-and-aft movement of the second magnetically attracting bearing face relative to the first magnetically attracting bearing face for stopping operation of the robot hand.

12. The overload safety apparatus according to claim 11, wherein the sensor is embedded in the first magnetically attracting bearing face.

13. The overload safety apparatus according to claim 11, wherein the sensor is embedded in the first magnetically attracting bearing face so as to be flush with the first magnetically attracting bearing face and to be oriented toward the second magnetically attracting bearing face.

* * * * *